No. 612,683. Patented Oct. 18, 1898.
W. J. & P. E. THOMAS.
POTATO PLANTER.
(Application filed Apr. 21, 1898.)
(No Model.) 3 Sheets—Sheet 1.

Witnesses
Jas. K. McCathran
V. B. Hillyard

William J. Thomas } Inventors
Percival E. Thomas
By their Attorneys,
C. A. Snow & Co.

THE NORRIS PETERS CO., PHOTO-LITHO., WASHINGTON, D. C.

No. 612,683. Patented Oct. 18, 1898.
W. J. & P. E. THOMAS.
POTATO PLANTER.
(Application filed Apr. 21, 1898.)
(No Model.) 3 Sheets—Sheet 2.

Witnesses
Jas. H. McLachlan
V. B. Hillyard

William J. Thomas
Percival E. Thomas
Inventors

By their Attorneys,
C. A. Snow & Co.

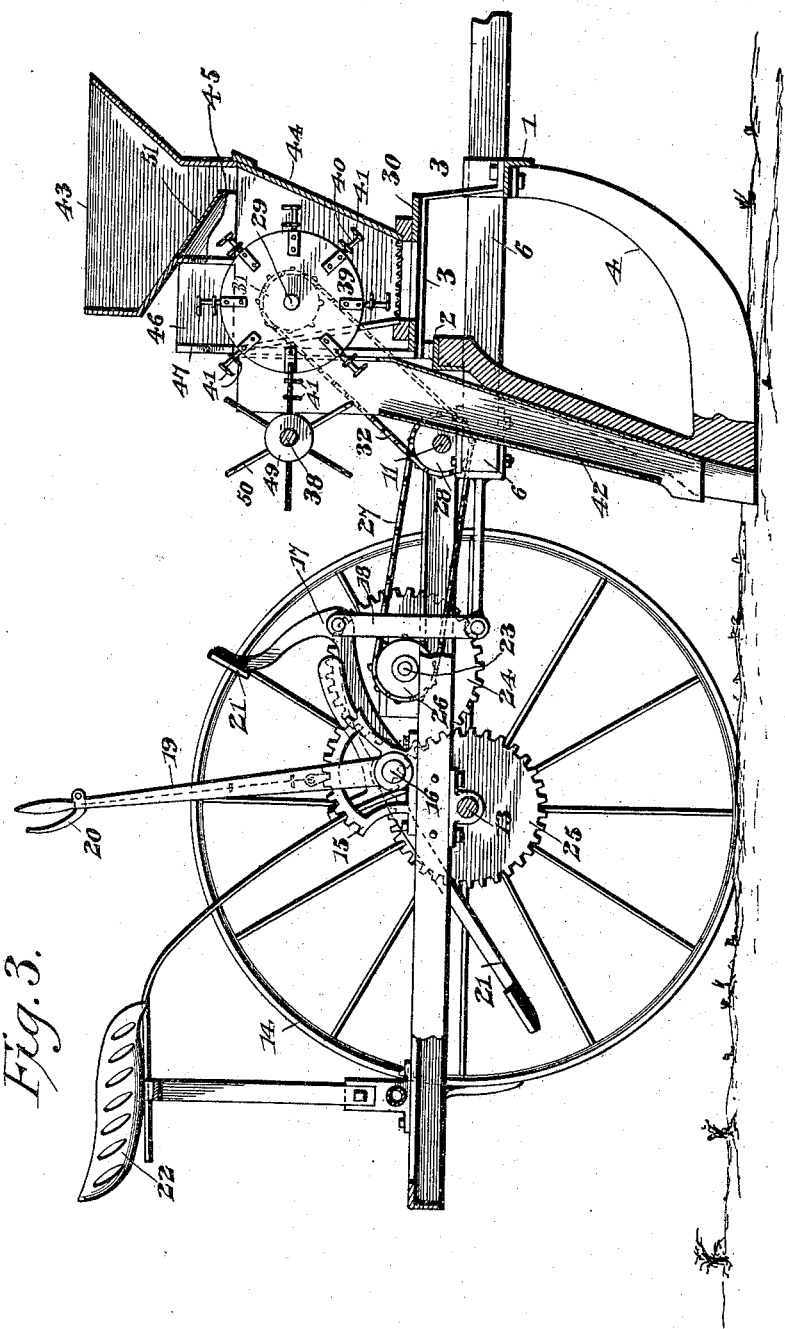

UNITED STATES PATENT OFFICE.

WILLIAM J. THOMAS AND PERCIVAL E. THOMAS, OF INGLEWOOD, CALIFORNIA.

POTATO-PLANTER.

SPECIFICATION forming part of Letters Patent No. 612,683, dated October 18, 1898.

Application filed April 21, 1898. Serial No. 678,411. (No model.)

*To all whom it may concern:*

Be it known that we, WILLIAM J. THOMAS and PERCIVAL E. THOMAS, citizens of the United States, residing at Inglewood, in the county of Los Angeles and State of California, have invented a new and useful Potato-Planter, of which the following is a specification.

This invention relates to planting machinery for sowing seed-potatoes in hills at any required distance apart, and is designed to provide a mechanism which will be positive in action and enable the attendant to observe the operation of the seeding mechanism, whereby it may become known when the seed has been exhausted or when the planting mechanism has become inoperative from any cause and is not dropping the seed as required for the successful operation of the machine.

A vital feature of the invention is the provision of a seeding mechanism which can, with slight changes, be readily adapted to any ordinary corn-planter, so that it may be converted and utilized for the purpose of planting seed-potatoes.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1:
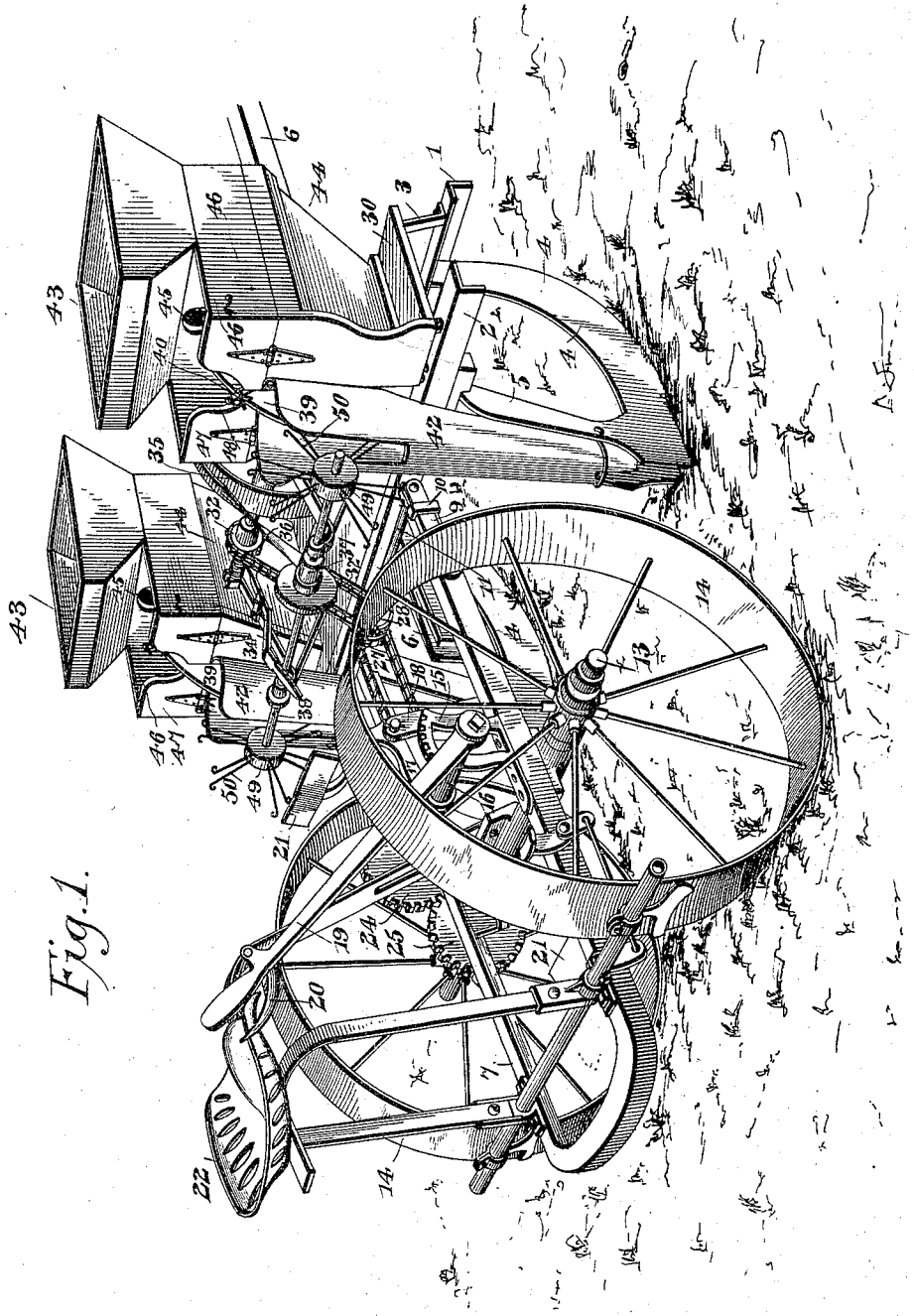
Figure 2:
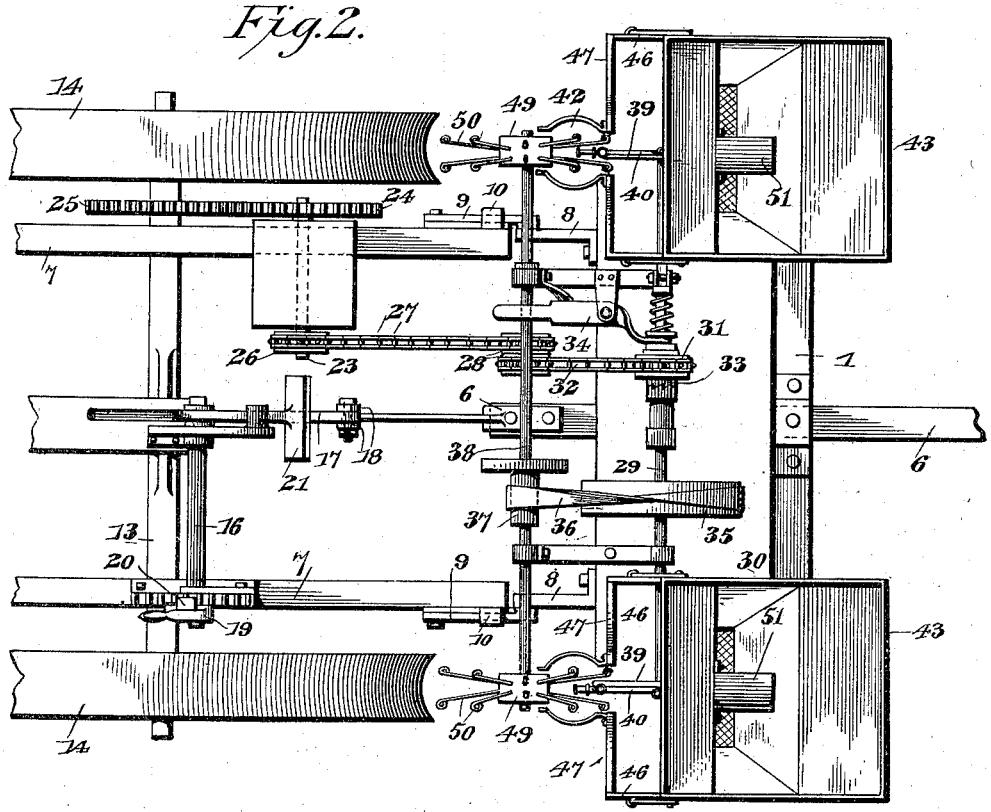
Figure 4:
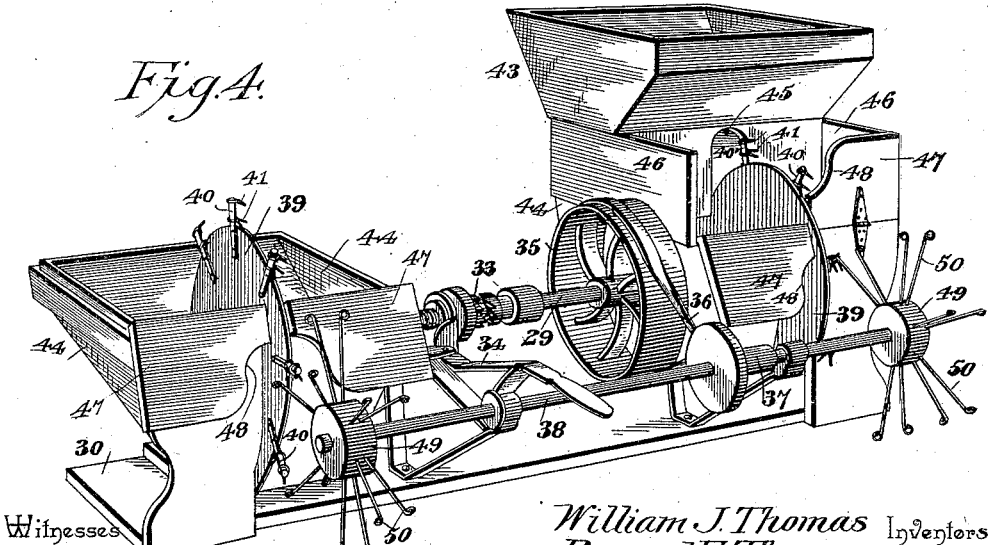

Figure 1 is a perspective view of a planter constructed in accordance with and embodying the principal features of this invention. Fig. 2 is a top plan view. Fig. 3 is a longitudinal section. Fig. 4 is a detail perspective view of the seeding mechanism, the near hopper being removed and the upper portions of the distributing-boxes being turned down.

Corresponding and like parts are referred to in the following description and indicated in the several views of the drawings by the same reference characters.

The runner-frame comprises front and rear transverse bars 1 and 2, longitudinal tie-bars 3, and runners 4, secured at their front ends to the bar 1 and at their rear ends to standards 5, connected at their upper ends with the rear bar 2. The pole or tongue 6, to which the draft is applied, is secured rigidly to the bars 1 and 2 and projects a short distance in rear of the bar 2 and has connection at its rear end with the operating-lever, by means of which the runners are adapted to be raised and lowered to regulate the depth at which the seed is planted.

The wheel-frame 7 is of an approximately U form, and its terminal portions are connected with rear extensions 8 of the runner-frame by means of coupling-bars 9, the latter having pivotal connection at their rear ends with the end portions of the side bars of the wheel-frame and having their front end portions operating through keepers 10, secured to the front ends of the side bars of the frame 7 and attached at their front ends to a shaft 11, mounted in the bracket extensions 8. This disposition of the coupling-bars 9 admits of the front portion of the wheel-frame moving vertically to obviate strain upon the coupling means between the wheel and runner frames when the machine is passing over rock and uneven ground. The axle 13 is journaled in bearings applied to the side bars of the wheel-frame, and is provided at its ends with ground-wheels 14, which act as drivers and as coverers for the seed when planted.

A toothed standard 15 is bolted or otherwise rigidly attached to a side bar of the wheel-frame 7, and supports one end of a shaft 16, which is provided at its inner end with an arm 17, connected by a link 18 with the inner or rear end of the pole or tongue 6, the outer end of said shaft having the lever 19 affixed thereto and supplied with the usual hand-latch 20 to coöperate with the toothed standard 15, so as to hold the runner-frame at the required adjusted position. The raising and lowering of the runner-frame is facilitated by means of a foot-lever 21, forming a continuation of or applied to the arm 17, said lever being readily accessible from the driver's-seat 22.

A short driving-shaft 23 extends parallel with the axle 13 and is journaled in bearings applied to the side bars of the wheel-frame, and has a gear-wheel 24, which intermeshes with a companion gear-wheel 25, secured to the axle 13, whereby motion is transmitted from said axle thereto when the machine is in operation. A sprocket-wheel 26 is provided on the shaft 23 and supports the rear end of a drive-chain 27, which passes around a double sprocket-wheel 28, mounted on the shaft 11. A shaft 29 is journaled in bearings applied to a plate 30, secured to the runner-frame, and is provided with a sprocket-wheel 31, which is driven from the double sprocket-wheel 28 by means of a sprocket-chain 32, and this sprocket-wheel 31 has a sliding movement on the shaft 29 to admit of the seeding mechanism being thrown into and out of gear. The sprocket-wheel 31 has a half-clutch upon one face to be thrown into gear with a corresponding half-clutch 33, secured upon the shaft 29, and the projecting hub portion at the opposite side is grooved to receive the active end of a shipper-lever 34, by means of which the sprocket-wheel 31 is thrown into and out of action. A band-pulley 35 is secured upon the shaft 29, and a drive-belt 36 connects the band-pulley with a smaller band-pulley 37 upon a shaft 38, parallel with the shaft 29 and journaled in bearings secured to the plate 30. The drive-belt 36 is crossed, thereby causing the shaft 38 to rotate in an opposite direction to the shaft 29, which is essential in order to secure a release of the seed-potatoes from the pick-up mechanism. The pulley 37 being of considerably less diameter than the pulley 35, obviously the shaft 38 will be rotated at a much higher rate of speed than the shaft 29, thereby permitting the releasing mechanism to disengage the seed-potatoes from the pick-up mechanism.

The pick-up mechanism consists, essentially, of a disk 39, secured upon each end of the shaft 29, and arms 40, secured at intervals in the length of the disk and provided at their outer ends with a series of spurs or prongs 41, which pierce the seed-potatoes and carry them upward and rearward to the seed-tube 42, located in the rear of the standards 5 and adapted to deposit the seed in the rear of the runners. The distance between the arms 40 will depend upon the intervals between the hills, and by spacing them a greater or less distance apart the seed-potatoes can be planted closer together or farther apart, as desired. The spurs or prongs 41 are provided in groups of three for each arm, the inner spurs of each group alining transversely and coming upon opposite sides of the plane of the disk and the outer spur being about in the plane of the disk.

A hopper or seed box 43 is located at each side of the machine and is removably fitted upon a distributing-box 44, which extends some distance in the rear of the hopper. An opening 45 is formed in the lower rear portion of each of the hoppers and provides an escape for the seed-potatoes when the machine is in operation. The lower portion of the hopper is contracted, and the side pieces of the contracted portion are extended rearwardly, as shown at 46, so as to come upon opposite sides of the opening 45 and prevent loss or waste of the seed. The rearwardly-extending parts 46 of the hoppers project over the rear portions of the distributing-boxes and are closed at their rear ends by doors 47, hinged to the upper edge of the rear wall of the boxes 44. The upper inner corners of the doors 47 are cut away, as shown at 48, to provide clearance for the arms 40 and the seed-potatoes carried thereby. The hoppers and distributing-boxes are in communication at their front portion, whereby the seed-potatoes supplied to the hopper gravitate to the distributing-box, so as to be picked up and delivered to the seed-tubes. The rear wall of each distributing-box is vertically slotted to provide for the operation of the pick-up disk 39.

The releasing mechanism comprises spur-wheels consisting of pulleys 49 and pairs of spring-arms 50, secured at their inner ends to the pulleys. A pulley 49 is secured upon each end of the shaft 38 in longitudinal alinement with the pick-up disks, and the arms of each pair are disposed so as to come upon opposite sides of the pick-up disks, thereby insuring a release of the seed-potato when the planter is in operation. The spring-arms are formed of wire and are outwardly divergent and have their outer ends expanded laterally, so as to engage with the seed-potatoes without bruising or injuring them. The arms are expanded laterally at their extremities by forming their outer end portions into eyes or coils, as clearly indicated. The rear portions of the pick-up disks travel rearwardly and downwardly, whereas the front portion of the releasing mechanism travels forwardly and downwardly, and inasmuch as the releasing mechanism travels at a higher rate of speed than the pick-up mechanism it is manifest that the seed-potatoes will be dislodged from the spurs or prongs of the pick-up disks and caused to drop into the seed-tube.

By having the lower portion of the hoppers contracted and the distributing-boxes made comparatively small the bulk of the seed-potatoes is retained in the hoppers and the pick-up mechanism can operate freely without requiring the seed-potatoes to be carried upward against a great pressure from above, which would be the result if the parts were differently related. The lower portion of the seedboxes is covered by wire-netting, through the meshes of which dirt and foreign matter can escape, thereby preventing the choking of the planting mechanism. A hood 51 extends inward from each opening 45 to prevent the potatoes crowding upon the spurs 41 and the seed-potatoes packed up thereby.

Having thus described the invention, what is claimed as new, and desired to be secured by Letters Patent, is—

1. In mechanism for planting seed-potatoes, the combination with a disk having spurs to engage with and pick up the seed-potatoes, of a pulley, and pairs of spring-arms secured to the pulley and adapted to operate upon opposite sides of the disk and disengage the seed-potatoes therefrom, substantially as set forth.

2. In mechanism for planting seed-potatoes, the combination with a disk having spurs to engage with and pick up the seed-potatoes, of a pulley, and pairs of spring-arms applied to the pulley and arranged to operate upon opposite sides of the disk, the spring-arms having their outer ends expanded laterally by being bent to form eyes or coils, substantially as and for the purpose set forth.

3. In a mechanism for planting seed-potatoes, the combination with a hopper having its lower portion contracted and provided with an opening in its lower rear wall, and having the side pieces of the contracted portion extended rearwardly, a distributing-box having the hopper mounted upon its forward portion and having its rear wall vertically slotted, and doors hinged to the top edge of the rear wall of the distributing-box and adapted to close the rear extensions of the hopper, and having their upper inner corners cut away to provide clearance for the seed-potatoes, of a pick-up disk operating in the distributing-box and through the vertical slot thereof and the opening of the hopper, and a releasing mechanism for disengaging the seed-potatoes from the pick-up disk, substantially as set forth.

4. In combination, a pair of distributing-boxes, hoppers mounted upon the front end portions of the boxes, a shaft, pick-up disks secured to the end portions of said shaft and operating in the distributing-boxes and hoppers, actuating mechanism for said shaft including a clutch mechanism mounted directly upon the shaft to admit of the seeding mechanism being thrown into and out of gear, a second shaft located in the rear of and parallel with the first-mentioned shaft, pulleys secured to the ends of said second shaft and provided with pairs of spring-arms to operate upon opposite sides of the pick-up disks, means for operating the second shaft directly from the first-mentioned shaft and at a higher rate of speed, and seed-tubes for receiving the seed when released from the pick-up disks and conveying it to the furrows, substantially as set forth.

5. In a potato-planter, the combination with a hopper and a distributing-box, of a rotary pick-up disk having fingers arranged to traverse the box and hopper, a rotatable releasing-disk driven in an opposite direction to, and at higher speed than, said pick-up disk and provided with arms arranged in active relation to the fingers of the pick-up disk to free seed-potatoes from the fingers of said pick-up disk, and a seed-tube into which seed-potatoes may be delivered from said pick-up and releasing devices, substantially as described.

6. In a mechanism for planting seed-potatoes, the combination with a hopper, and a distributing-box, of a shaft carrying a rotary pick-up mechanism arranged to operate in said hopper and box, another shaft parallel to the first-named shaft and carrying a series of releasing-arms which are arranged in pairs to embrace the pick-up mechanism and force seed-potatoes therefrom, gearing between the two shafts for rotating the shaft which carries the release devices at a higher speed than, and in an opposite direction to, the shaft with the pick-up devices, and a seed-tube in operative relation to said pick-up and releasing devices, substantially as described.

7. In a mechanism for planting seed-potatoes, the combination with a rotary pick-up mechanism, of an oppositely-rotating releasing mechanism comprising pairs of spring-arms arranged to straddle or embrace the pick-up mechanism and expel seed-potatoes therefrom, substantially as described.

In testimony that we claim the foregoing as our own we have hereto affixed our signatures in the presence of two witnesses.

WILLIAM J. THOMAS.
PERCIVAL E. THOMAS.

Witnesses to signature of W. J. Thomas:
C. Z. REITZ,
G. E. GOUGHNOUR.

Witnesses to signature of P. E. Thomas:
CHAS. H. MATTINGLY,
MARY M. THOMAS.